July 21, 1959  Z. D. SHELDON ET AL  2,895,806
METHOD FOR DETERMINING THE STABILITY OF FLUOROCARBON OILS
Filed Feb. 11, 1946  2 Sheets-Sheet 2
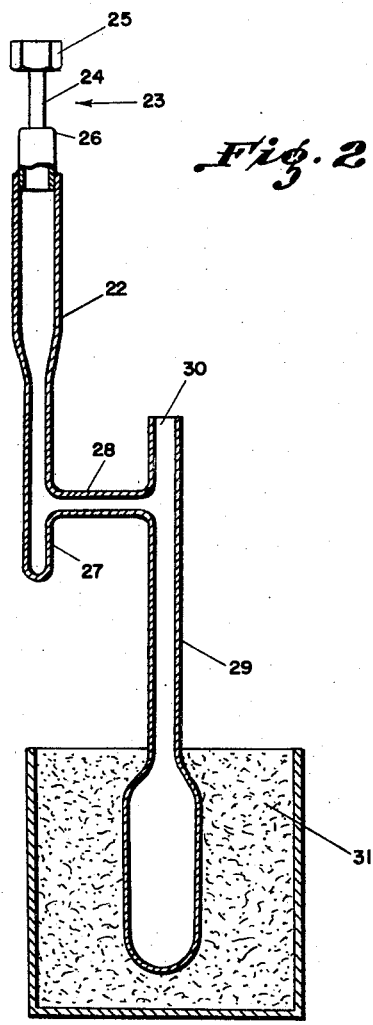
*INVENTOR.*
ZACHARY D. SHELDON
HELMUT M. HAENDLER
BY Patented July 21, 1959

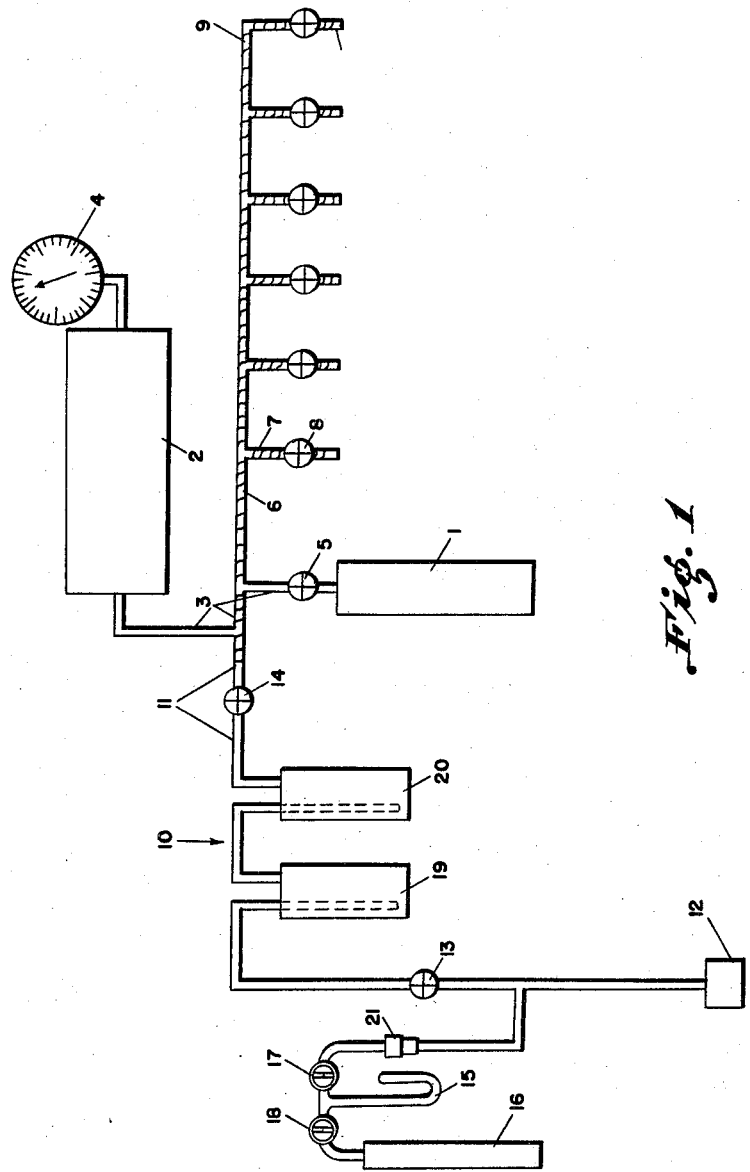

2,895,806

METHOD FOR DETERMINING THE STABILITY OF FLUOROCARBON OILS

Zachary D. Sheldon, Rochester, N.Y., and Helmut M. Haendler, Durham, N.H., assignors to the United States of America as represented by the United States Atomic Energy Commission Application February 11, 1946, Serial No. 646,948

1 Claim. (Cl. 23—230)

This invention relates to an apparatus and method for measuring a predetermined weight of a material which must be protected from air and reacting said material with another material and in particular to an apparatus and method for testing the stability of fluorocarbon oils to uranium hexafluoride.

Fluorocarbon oils have been proposed as machine lubricants in plants for enriching uranium hexafluoride with respect to the uranium isotope of atomic weight 235. The most useful oils for this purpose are the high molecular weight, saturated compounds of carbon and fluorine. The commercially prepared oils, however, may contain impurities which react with the hexafluoride so that contact between the two materials may result in the consumption of exceedingly valuable enriched uranium hexafluoride. The need therefore arises for devising a method and equipment for determining the stability of fluorocarbon oils to uranium hexafluoride, whereby they may be evaluated for this use.

It is thought that the principal impurities are compounds containing hydrogen and/or unsaturated bonds and that the reactions involve reduction of the uranium hexafluoride to the tetrafluoride. The following typical reactions may occur:

$$C_{14}F_{23}H + UF_6 = C_{14}F_{24} + HF + UF_4$$

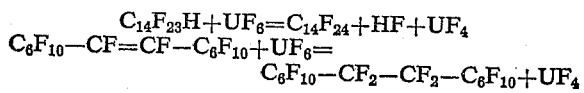

If a predetermined weight of a fluorocarbon oil can be reacted with a predetermined weight of uranium hexafluoride (a large excess of the latter over that needed to react with the oil weight taken generally being used) the weight of uranium tetrafluoride produced per gram of oil can be determined and will indicate the stability of the oil to uranium hexafluoride. A comparison of the values obtained for various oils will indicate their relative stability. However, since uranium hexafluoride hydrolyzes in the presence of moisture the problem arises of measuring and reacting this material in such a manner that it is protected from air at all times.

It is therefore an object of the present invention to devise an apparatus and method for measuring a predetermined weight of a material which must be protected from air and reacting said material with another material, such as may be used for determining the relative stability of various fluorocarbon oils to uranium hexafluoride.

One underlying principle of the present invention is that a desired weight of a material may be separated from a larger mass by permitting the material in the form of a gas to fill up a container of predetermined volume until a predetermined pressure at a predetermined temperature is attained. Thus, the apparatus of the present invention consists of a gas measuring and transfer system and a reaction apparatus and in general comprises a storage receptacle for the material sensitive to air connected to a measuring unit consisting of a container of predetermined volume and coupled pressure indicator, and a reaction apparatus connected to the container. An evacuating unit is connected in a manner to permit evacuation of air from the container and reaction apparatus prior to the steps of measuring and transferring the sensitive material. The apparatus may be operated by first introducing into the reaction apparatus a weighed amount of the material which is not sensitive to air, coupling the latter apparatus to the gas measuring and transfer system, evacuating air from said apparatus and the container, permitting the vapor of the sensitive material to fill the container until a predetermined pressure has been attained and then emptying the contents of the container into the reaction apparatus such as by opening the passage between them and maintaining the reaction apparatus at a temperature to effect condensation of the vapor therein. Finally the reaction apparatus is completely sealed and the materials are permitted to react. Preferably the reaction apparatus is weighed before and after transfer of the vapor thereto as a check on the weight of the sensitive material actually transferred. When the materials which have been made to react are a fluorocarbon oil and uranium hexafluoride and the purpose is to determine stability, the amount of $UF_4$ produced per gram of oil used may then be determined by employing analytical reactions which involve oxidation of the $UF_4$ with a standard dichromate solution added in excess amount and titration of the excess dichromate with a standard ferrous solution.

In this way a desired weight of a sensitive material may be separated from a larger mass and caused to react without permitting the material to come in contact with air. It is understood that if there are several materials to be used in the reaction mixture which require protection from air, they may each be transferred in the described manner Also, if there are several materials to be used in the reaction mixture which are not sensitive to air they may each be introduced into the reaction apparatus prior to transferring the sensitive material thereto.

The entire apparatus is generally useful for measuring a predetermined weight of a material which may not be exposed to air because of instability, toxicity, or for any other reason, and reacting said material with another material, provided the sensitive material has an appreciable vapor pressure at feasible temperatures. The gas measuring and transfer system is generally useful for measuring and transferring a predetermined weight of such a material to a receiver.

The invention will be described with particular reference to testing the relative stability of several fluorocarbon oils to uranium hexafluoride and to the drawings, in which:

Fig. 1 is a gas measuring and transfer system; and
Fig. 2 is a reaction apparatus.

Referring to Fig. 1, a tank 1 containing solid uranium hexafluoride is connected to a cylinder 2 of about 3500 ml. capacity by means of the line 3. The cylinder is provided with a pressure indicator 4. The valve 5 controls the outflow of vapor from the tank 1. A manifold 6 is connected at a point in the line 3 and is provided with a plurality of outlet pipes 7 and respective control valves 8. An electrical heating coil 9 is wound about the manifold and connected tubings, as shown.

An evacuating unit 10 is connected at a point in the line 3 and consists essentially of a line 11 connected to the line 3, a vacuum pump 12 and control valves 13 and 14. A closed end manometer 15, for observing pressure change, and a drying tube 16 normally closed to the atmosphere, for removing any moisture in the air subsequently admitted to the manometer, are connected to the line 11. Stopcocks 17 and 18 are provided for disconnecting these elements from the line 11. Traps 19 and 20 cooled by liquid air, for protecting the pump from uranium hexafluoride, are connected in the line 11 between the pump and the gas transfer elements. The construction material of the gas transfer system is preferably substantially of a metal such as copper, the container 2 preferably being of nickel. The manometer and drying tube and their connections are of glass and are joined to the metal parts of the system by a glass to copper seal 21.

Referring to Fig. 2, the tube 22 is provided with a copper fitting 23 for coupling the reaction apparatus to one of the outlet pipes of the manifold (see Fig. 1). The fitting consists of a copper tube 24 and nut 25 and is connected to the tube 22 by a copper to glass seal 26. The tube 22 has a depending portion 27 for trapping particles of dirt, metal, solid uranium hexafluoride and the like as the gaseous compound passes through the tube. Just above this portion a cross-piece 28 forms a passage between the tube 22 and the tube 29, in the latter of which the vapor is caused to condense and subsequently to react with the fluorocarbon oil. The tube 29 has an opening 30 and upper portion which are sufficiently wide to permit the oil sample to be introduced without adherence to the upper walls, and are substantially wider than the internal diameter of the copper tube 24; and a lower portion of enlarged diameter to provide increased surface for contact between the oil and the hexafluoride. The tube 22 may be heated by means of a hand torch (not shown) in order to maintain the uranium hexafluoride in gaseous form before it reaches the tube 29; and the tube 29 is surrounded with a cooling medium 31 for condensing the hexafluoride gas.

The determination of the relative stability of various fluorocarbon oils may be carried out in the following manner. The reaction apparatus is thoroughly washed and dried, preferably without the use of organic solvents. About 10 grams of oil are weighed in a clean, dry weighing bottle, the weight being determined by difference. The oil is poured into the tube 29 at the opening 30, care being taken to keep the oil from adhering to the upper side walls. The top of the tube 29 is sealed at 30 by a conventional glass blowing technique. The tube 22 is closed by a plug at the fitting 23 and the reaction apparatus is weighed. The plug is removed and the reaction apparatus is connected to one of the valves 8 of the manifold 6. A cooling mixture of solid carbon dioxide and trichlorethylene is placed around the lower portion of the tube 29.

The gas measuring and transfer system and the reaction apparatus are now evacuated, valves 13, 14 and 8 and stopcock 17 being open and valve 5 closed. The manifold and connected tubings are heated gently by the coil 9. The pressure is observed by means of the manometer 15. When a good vacuum has been obtained valves 14 and 8 are closed. The valve 5 of the tank 1 containing solid uranium hexafluoride is opened and the vapor of this compound, which has an appreciable vapor pressure at 25° C., passes into the evacuated container 2. This process is permitted to continue until the pressure, as observed by means of the indicator 4, becomes stable, at which time the container is saturated with the gas. When equilibrium is established the indicator will record about 26 inches of vacuum. Under these conditions the container delivers about 7 grams of uranium hexafluoride.

The valve 5 is closed and the valve 8 opened. Heat is applied gently to the tube 22 by means of a hand torch. Uranium hexafluoride gas passes out of the container 2, into the line 3, the manifold 6, the outlet pipe 7, the tube 22, the cross-piece 28 and finally into the tube 29 where it condenses. When it appears that condensation has ceased the valve 8 is closed. If an additional quantity of uranium hexafluoride is desired to be added to the amount already measured out, the steps of filling the container to a predetermined pressure and emptying its contents into the same reaction apparatus may be repeated as many times as desired. The cooling mixture is then replaced by liquid air or liquid nitrogen. Finally the tube 29 is sealed off from the tube 22 by fusing and breaking the cross-piece 28.

The tube 29 is allowed to warm to room temperature. The outside is washed with a solvent such as acetone and dried. All the parts of the reaction apparatus, together with the plug, are weighed.

The same procedure may be repeated as many times as desired to obtain a number of reaction mixtures containing predetermined amounts of the fluorocarbon oil and the uranium hexafluoride. The tubes 29 are warmed in warm water and then placed in a boiler filled with water and heated at about 100° C. for about 3 hours or other specified time. At the end of this time the tubes are cooled by running cool water over them and are then dried and chilled in liquid air.

The contents of each tube are analyzed to determine the extent of reduction of the uranium hexafluoride to the tetrafluoride. The method of analysis involves oxidation of the $UF_4$ produced with excess of a standard dichromate solution and titration of the excess dichromate with a standard ferrous solution.

The tip of the tube 29 is warmed with a micro flame and quickly inverted in a beaker containing 100 to 150 ml. of water. The contents of the tube are throughly washed out and the liquids are collected. The mixture is stirred rapidly until hydrolysis of the excess uranium hexafluoride appears to be complete. About 25 ml. of a distilled short chain alkyl compound containing fluorine and chlorine such as $CFCl_2$—$CF_2Cl$, is added to permit more efficient mixing when the oxidant is added.

There is then added 20 ml. of a titration mixture consisting of 75 ml. of 85% $H_3PO_4$, 75 ml. of concentrated $H_2SO_4$, 75 ml. of water and about 10 g. of ferric chloride. Then 5 to 10 ml. of a 0.05 N potassium dichromate solution is added, the mixture is stirred vigorously for an hour or allowed to stand overnight.

Six drops of 0.2% barium diphenylamine sulfonate solution are added and the excess dichromate is back-titrated immediately with an approximately 0.05 N ferrous ammonium sulfate solution which has been standardized with respect to the potassium dichromate solution. The ferrous solution may be stabilized with sulfuric acid.

The amount of dichromate used to oxidize the $UF_4$ produced is calculated and converted into terms of grams of $UF_4$ per gram of oil. A comparison of the number of grams of $UF_4$ produced per gram of oil sample used, for the various oil samples tested, indicates the relative stability of the oils to uranium hexafluoride.

Typical data and calculations for an analysis are as follows:

Weight of fluorocarbon oil=10.342 g.
Weight of uranium hexafluoride=13.396 g.
Ml. of $K_2Cr_2O_7$ added first=10.02 ml.
Ml. of $Fe^{++}$ added=7.39.
Ml. of $Fe^{++}$ as 0.05 N=7.19 ml. (1 ml. $Fe^{++}$=0.9731 ml. 0.05 N $K_2Cr_2O_7$).
Ml. of $K_2Cr_2O_7$ for blank=0.33 ml.
Excess 0.05 N $K_2Cr_2O_7$=7.52 ml.
Ml. $K_2Cr_2O_7$ actually used=2.50 ml.
G. $UF_4$ equivalent=2.50×0.007852=0.01963 g.
G. $UF_4$/g. oil=0.01963/10.342=0.001898 g.=0.190%.

The apparatus and method of the present invention are applicable when the material sensitive to air is either more or less volatile than uranium hexafluoride. Thus, if the material is a gas at 25° C. the storage receptacle may contain the gas under pressure; and if the material is less volatile the gas measuring and transfer apparatus may be operated at elevated temperatures.

Since many embodiments might be made of the present invention and since many changes might be made in the embodiment described, it is to be understood that the foregoing description is to be interpreted as illustrative only and not in a limiting sense.

We claim:

The method of determining the stability of a fluorocarbon oil to uranium hexafluoride which comprises treating a sample of the oil by weighing a sample of the oil, evacuating a reaction zone containing said oil sample, evacuating a container space of predetermined volume, causing the vapor of uranium hexafluoride to flow into said container space until a predetermined pressure is attained, causing the vapor so collected to flow into the reaction zone and to condense in said zone, causing the uranium hexafluoride to react with said oil sample, and titrating the amount of uranium tetrafluoride produced by means including a standard dichromate solution.

References Cited in the file of this patent

UNITED STATES PATENTS

| | | |
|---|---|---|
| 418,499 | Cochran | Dec. 31, 1889 |
| 1,507,919 | Johnson | Sept. 9, 1924 |
| 1,614,184 | Caccia | Jan. 11, 1927 |
| 1,809,325 | Austin et al. | Jan. 9, 1931 |
| 1,877,368 | Seyer | Sept. 13, 1932 |
| 2,192,140 | McCreary | Feb. 27, 1940 |
| 2,298,976 | Shillinglaw et al. | Oct. 13, 1942 |